United States Patent [19]

Pires

[11] 4,207,596
[45] Jun. 10, 1980

[54] VIDEO SPECIAL EFFECTS WITH CASCADED CONTROL LOGIC

[75] Inventor: H. George Pires, Parlin, N.J.

[73] Assignee: Crosspoint Latch Corp., Summit, N.J.

[21] Appl. No.: 905,802

[22] Filed: May 15, 1978

[51] Int. Cl.$^2$ .............................................. H04N 5/22
[52] U.S. Cl. .................................................... 358/182
[58] Field of Search ..................... 358/22, 30, 33, 182, 358/184; 179/1 R, 1 A; 330/30 R, 124 R

[56] References Cited

U.S. PATENT DOCUMENTS

| | | | |
|---|---|---|---|
| 3,472,957 | 10/1969 | Kaye et al. | 358/182 |
| 3,619,495 | 11/1971 | Ito et al. | 358/182 |
| 3,673,324 | 6/1972 | Ito et al. | 358/22 |

Primary Examiner—Benedict V. Safourek
Attorney, Agent, or Firm—Marianne Rich

[57] ABSTRACT

Each of the video signals to be combined to create the special effect is applied to the first input of the corresponding one of a plurality of mixing units. The outputs of the mixing units are connected in common. Each mixing unit has a second input. The synchronization and burst signals of one of the video signals is applied to the second input of one of the mixing units. The gain of each mixing unit relative to the applied signal at the first input varies as a function of a corresponding control signal. Each control signal has an amplitude varying directly with the amplitude of an externally applied input signal and inversely with the amplitude of the next following input signal. Where n video signals are combined, n input signals are provided and the first control signal is a signal at the output of n - 1 cascaded amplifier stages, the first of which has a main input connected to receive the corresponding input signal, an override input connected to receive the next subsequent input signal and an output connected to the main input of the next cascaded stage. The override input of the next cascaded stage is connected to receive another selected input signal. The final control signal applied to each mixing unit is thus the corresponding input signal decreased in proportion to each subsequent input signal. The strength of the component in the video output signal corresponding to the video signal furnished by the mixing unit controlled by the control signal is similarly decreased relative to the strength it would have in the absence of the remaining input signals.

14 Claims, 11 Drawing Figures

VIDEO SPECIAL EFFECTS WITH CASCADED CONTROL LOGIC

BACKGROUND OF THE INVENTION

The present invention relates to special effects generators in video systems. A special effects generator produces a scene which is a combination of two or more video signals. The combination may be a simple additive mix or a more complicated function which consists of combination mixes, effects, and keys. The special effects may for example include horizontal split wipe effects, wherein a first signal input is displayed on the screen during the first half of each line and a second input during the second half of each line. Keying is defined as the blanking of the picture in response to a keying signal. Numerous other special effects can of course be produced and are to be included in the scope of this invention. In presently known systems, the video signals to be mixed are routed first through a mixing unit which performs the mix function; the output of the mixing unit is then applied to the input of the effects unit where the particular special effects are generated. Additional mixing and further effects may be required, causing the video signals to be passed through a number of units before the final special effect has been achieved.

The conventional units thus have a number of associated problems. First, each mixing or effects element creates a time delay. This time delay must be equalized for all signals entering a particular unit. However, the delay lines which are utilized to create an equivalent delay have frequency characteristics for which compensation must then be added. Further, the delay lines must be properly terminated, thereby requiring a driving circuit which in turn must have frequency compensation. Another difficulty is that for different applications, delay lines may have to be switched in and out, which requires additional logic. Still another difficulty is that the correct DC level and amplitude have to be maintained throughout the rerouting of the signals. Unless great care is taken, the levels tend to drift in operation and the difference in level becomes visible as an undesired flash in the picture. Still another difficulty is that a great deal of space is required for the equipment and in particular for the delay lines and that the adjustment of the delay lines is a very time consuming process. Finally, the conventional systems must be periodically realigned, which is a lengthly process and requires relatively skilled personnel.

SUMMARY OF THE INVENTION

It is an object of the present invention to furnish apparatus wherein a combination of video signals can take place without the above described routing of the video signals.

The present invention is apparatus for mixing a plurality of video signals to furnish a video output signal having a plurality of components each corresponding to one of said plurality of video signals. It comprises a plurality of video amplifier means each for amplifying one of said plurality of video signals in accordance with a control signal applied thereto. Each of said video amplifier means furnishes an amplified video signal which constitutes one of the components of said video output signal. Means are furnished for combining all of said amplified video signals thereby creating said video output signal. Finally, control signal furnishing means are provided for furnishing said control signals to said amplifiers. Said control signal furnishing means comprise externally operable input signal furnishing means, one for each of said components, as well as a plurality of control signal amplifier means each interconnected between the corresponding one of said input signal furnishing means and said video amplifier means, for furnishing said control signal to said video amplifier means in response to the corresponding one of said input signals. All except a selected last of said control signal amplifier means have means for decreasing the amplitude of their respective control signal in response to increases in at least another selected one of said input signals.

In a preferred embodiment of the present invention the decrease in amplitude of the respective control signal in response to increases in another selected one of said input signals is a linear decrease.

Further, in a preferred embodiment, the control signal amplifier means are arranged in a selected order and at least one of said control signal amplifier means comprises a plurality of amplifier units connected in cascade, each of said amplifier units having means for decreasing the signal at its output in correspondence with another selected one of said input signals.

The present invention, both as to its construction and its method of operation, together with additional objects and advantages thereof, will best be understood from the following description of preferred embodiments when read in connection with the accompanying drawing.

DESCRIPTION OF THE PREFERRED EMBODIMENT

The difficulties with the conventional systems will first be detailed with reference to FIG. 1. It should be noted that the conventional systems form the part of FIG. 1 to the right of the "time datum" line. The switching matrix to the left of this line can also form a part of the present invention. The switching matrix is one which permits any one of a plurality of video inputs (in FIG. 1, five video inputs are shown) to appear at the output of any of a plurality of buses (in FIG. 1 four buses are shown). Each cross in the matrix indicates a switchable connection. These crosspoints are electrically interlocked horizontally, that is, whenever a new switching connection is closed, the crosspoint which was previously "on" on the same bus is disconnected. Each bus has only one crosspoint "on" at any given time. The bus lines are designated A, B, C and D. A buffer amplifier is connected to the output of each bus.

For buses A and B, the buffer amplifier is followed by a delay line $D_E$, while a delay line $D_M$ is connected to the output of the buffer amplifiers of buses C and D. Each buffer-delay line combination can be shorted out by a switch indicated as SDM,SDE in FIG. 1. The output of each of the delay lines $D_E$ is connected to a corresponding input of a mixing unit 10 while the delay lines $D_M$ are each connected to an input of an effects unit 11. The output of mixing unit 10 may be connected to the outputs of buses C and D by individual switches $M_C$ and $M_D$ respectively. The output of the effects unit 11 may similarily be connected to the output of buses A and B by switches marked $E_A$ and $E_B$ respectively. The delay afforded by delay unit $D_E$ is equal to the delay of the video signal through the effects unit 11, while delay $D_M$ is equal to the delay of the video signal as it passes through mixing unit 10. The output of the above described arrangement may be derived either from the output of the mixing unit or from the output of the effects unit, or both.

If the outputs are derived from a combination of the mix unit and the effects unit, delays $D_E$ and $D_M$ are all in circuit, so that the overall delay of the apparatus from the datum line is $D_M+D_E$ regardless of whether the mix or the effects unit is being used. If, however, the $M_C$ crosspoint switch is closed in order to create an effect between the D bus and the output of mix unit, then both $D_E$ delay lines would be shorted out, as would delay line $D_M$ in bus C. The overall delay of $D_M+D_E$ is thereby still maintained. When any of the other re-entry crosspoints ($E_A$, $E_B$, $M_D$) is activated, this same total delay is maintained by shorting out the corresponding delay lines.

Figure 2A:
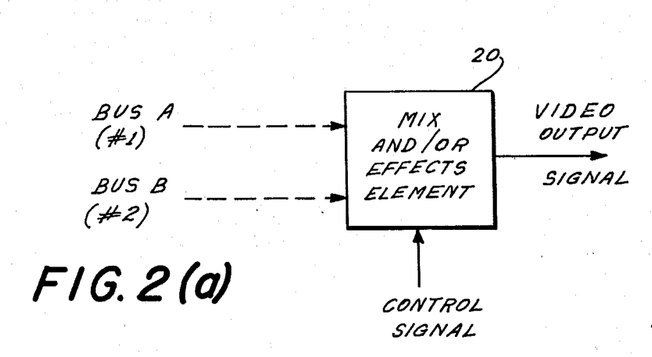
FIG. 2a is a block diagram of an embodiment of the present invention for mixing a first and second video signal.
Figure 2B:
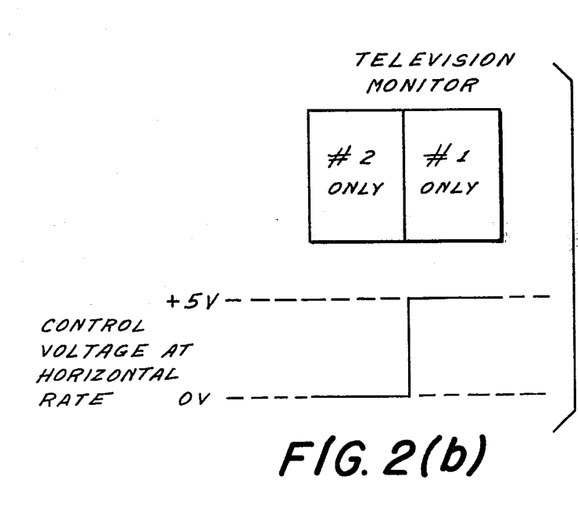
FIGS. 2b-2f illustrate control voltage variations and the corresponding displays.
Figure 2C:
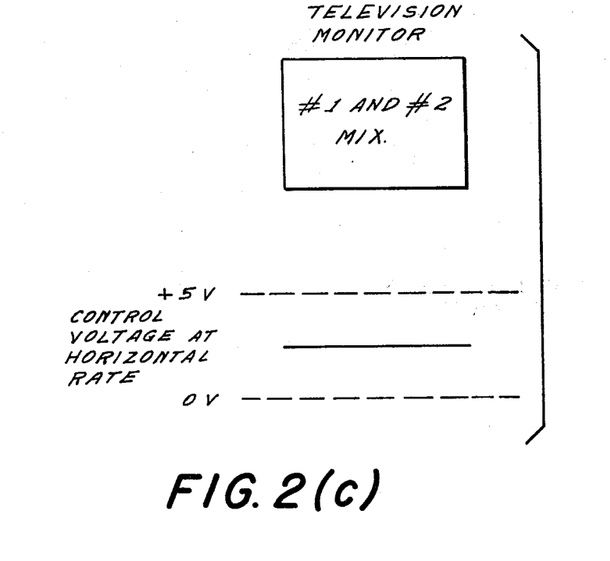
Figure 2D:
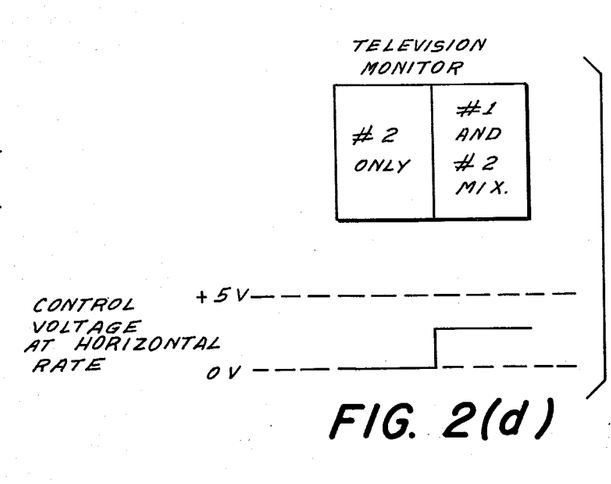

Let it now be assumed that it is desired to create the display on the monitor shown in FIG. 2d. For this, input 1 would be switched to bus A and input 2 to bus B. Under these conditions, the output of mixing unit 10 will be a mixture of video signals 1 and 2. This mixture is then to be combined with video input 2 in effects unit 11, or, more specifically, in effects unit 11 a horizontal split wipe is provided which will allow the signal from the first input of effects unit 11 to be displayed during the second half of each horizontal line and that of the second input to the effects unit to be displayed during the first part of each horizontal line. Crosspoints $M_C$ and $2_D$ are therefore also closed. The desired output will be obtained from effects unit 11, but it should be noted that the first and second video signal had to be routed through mixing unit 10 and that logic circuitry had to be provided for shorting out both delay lines $D_E$ and delay line $D_M$ upon closing of crosspoint switch $M_C$.

Figure 4:
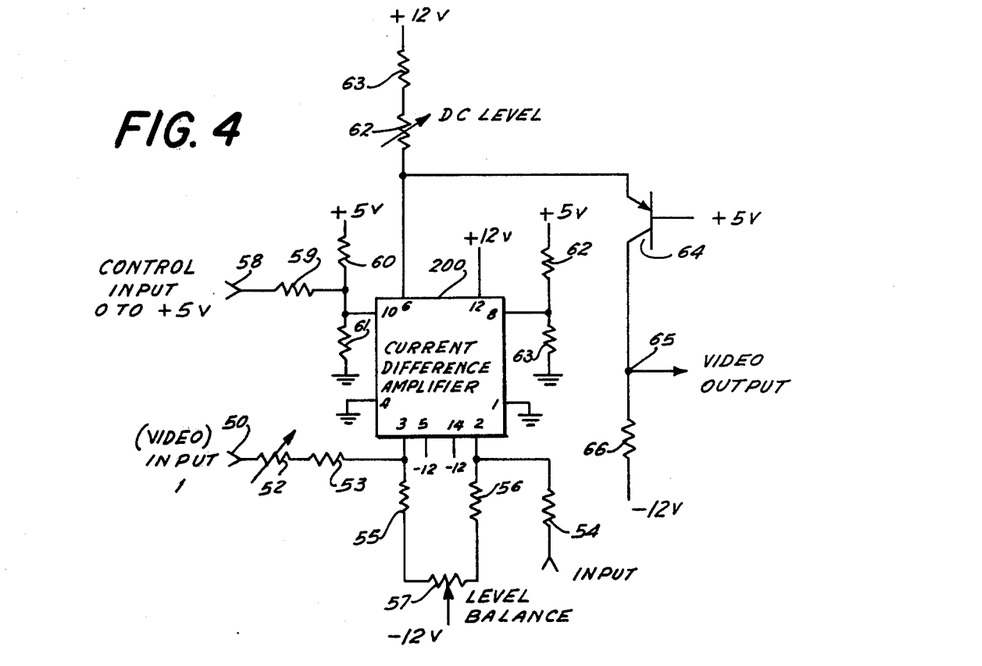
FIG. 4 is a more detailed circuit diagram of the mixing units of FIG. 3.

The same display on the monitor can be achieved by the simplest embodiment of the present invention, namely the circuit shown on block diagram form in FIG. 2a and in greater detail in FIG. 4. The circuit will be discussed in greater detail with reference to FIG. 4. As shown in block diagram form in FIG. 2a, the first video signal is applied to the first input of a mix/effects element 20 while the second video signal is applied to its second input. The video output signal has a first component corresponding to the first video signal and a second component corresponding to the second video signal, the ratio between components being determined by the instantaneous value of the control signal. Specifically, in a preferred embodiment, when the control signal is at its minimum value (e.g. 0 volts) only video signal 2 will appear at the output while for a maximum value of the control voltage (e.g. 5 volts) only video signal 1 will appear at the output. For intermediate values corresponding ratios of the two signals will be obtained. This is illustrated in FIG. 2b, 2c and 2d. In FIG. 2b the control voltage is changed from the minimum to the maximum value instantaneously in the middle of each horizontal line of the display. The resultant display corresponds to video signal 2 on the left hand side and video signal 1 on the right hand side. In FIG. 2c, a 50-50 mixture of the two signals is obtained by applying one-half the maximum control voltage throughout each line interval. As a last illustration, the example FIG. 2d shows a control voltage which is at its minimum value for one-half a line interval and then is abruptly raised to one-half its value in the center of each line. Under these conditions the display will correspond, on the left hand side to video signal 2 only while on the right hand side it will constitute a mix of signals 1 and 2.

Figure 2E:
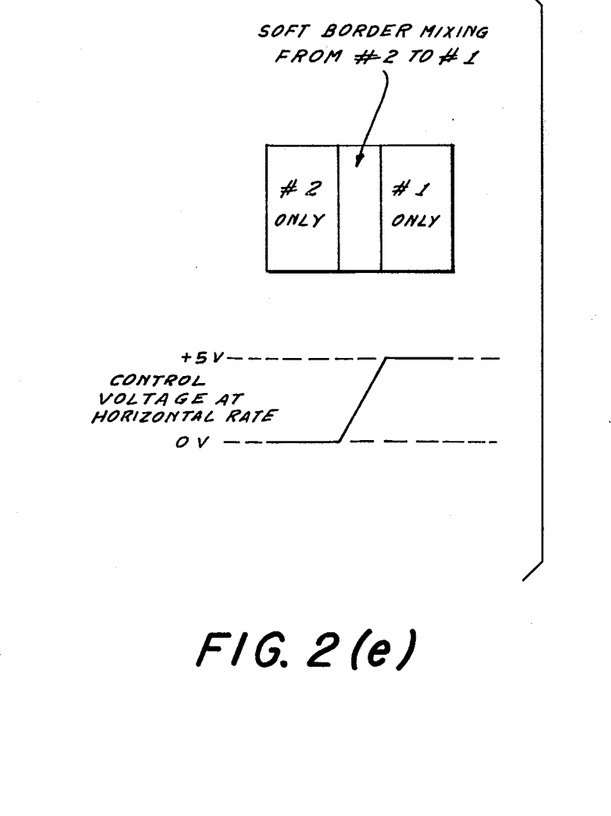

The present circuit is also readily adaptable to generate a soft border, that is a slow fade from one type of display to the next. This is accomplished by a slow increase in control voltage during the width of the soft edge. (FIG. 2e).

Figure 3:
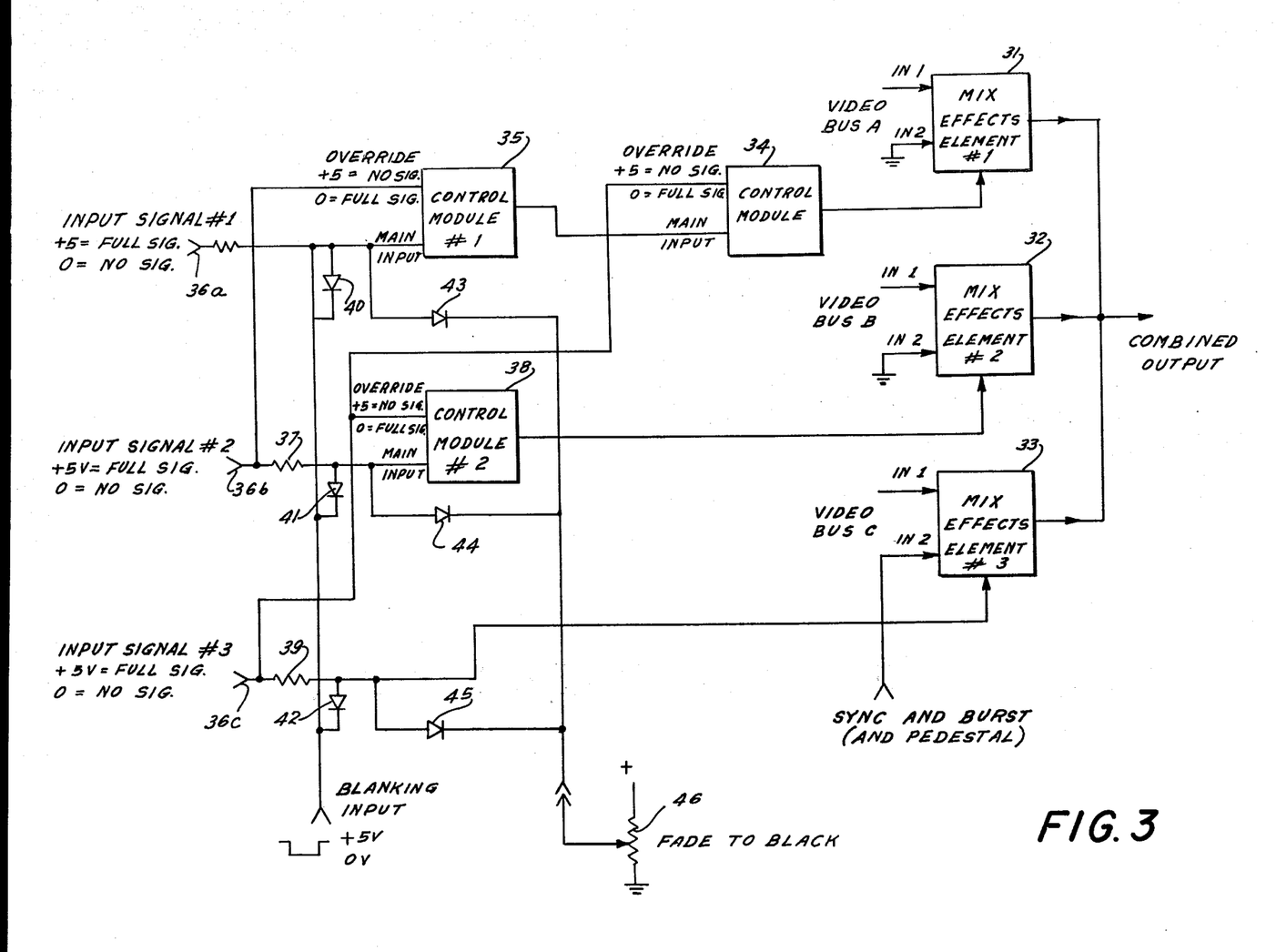
FIG. 3 is a preferred embodiment of the present invention for mixing more than two video signals.

While the above described circuit readily eliminates the conventional difficulties of delay times, frequency distortion, etc. when two signals are mixed, it must be modified for mixing three or more signals. Shown in FIG. 3 is apparatus for mixing a first, second and third video signal. The first, second and third video signals are applied, respectively to the first signal input of a first, second, and third mix-effects element 31, 32, 33 herein also referred to as video amplifier means. The outputs of units 31, 32 and 33 are connected in common and furnish the video output signal which has a first, second and third component corresponding, respectively, to the first, second and third video signals. Each of units 31, 32, and 33 have a second signal input. The second signal input of units 31 and 32 is grounded while that of unit 33 receives the synchronization and burst signals associated with a selected one of the video signals. Each of units 31, 32 and 33 further has a control input. It is the signal at this control input which determines the relative magnitude of the corresponding component in the video output signal. The first control signal, namely the control signal applied to unit 31, is derived from the output of a control module 34 which has a main input connected to the output of a similar control module 35 and an override input connected to a terminal 36c which receives a third input signal. Control module 35 has a main input connected to a terminal 36a which receives a first input signal and an override input connected to a terminal 36b which receives a second input signal. The second input signal is also applied through a registor 37 to the main input of a control module 38 whose override input is also connected to terminal 36c. The output of control module 38 is connected to the control input of unit 32 and carries the second control signal. Terminal 36c is further connected through a resistor 39 to the control input of unit 33. Diodes 40, 41, 42 have cathodes which are connected in common to receive a blanking input. The anode of diode 40 is connected to the main input of control module 35, that of diode 41 to the main input of control module 38 and that of diode 42 to the side of resistor 39 which is away from terminal 36c. A further set of diodes, 43, 44 and 45, have cathodes connected in common to the tap of a voltage divider 46. The anode of diode 43 is connected to the main input of control module 35, that of diode 44 is connected to the main input of control module 38, and the anode of diode 45 is connected directly to the anode of diode 42.

The above described arrangement operates as follows. The input signals applied at terminals 36a, 36b, 36c are signals which vary from a predetermined minimum to a predetermined maximum amplitude. A signal applied to an override input of one of the control modules (also referred to as control amplifier means) linearly overrides the main input. Assume that, at the start, input signals 2 and 3 are at the minimum level. This causes the video signals at the first signal inputs of units 32 and 33 to be suppressed. If the input signal at terminal 36a is at the maximum value (e.g. 5 volts) then the video signal applied to the first input of unit 31 will appear full strength in the video output signal. It should be noted here that the amplification of the control signal amplifier means is a factor of one, that is, in the absence of an override input the signal at the main input is transmitted full strength to the output.

Figure 2F:
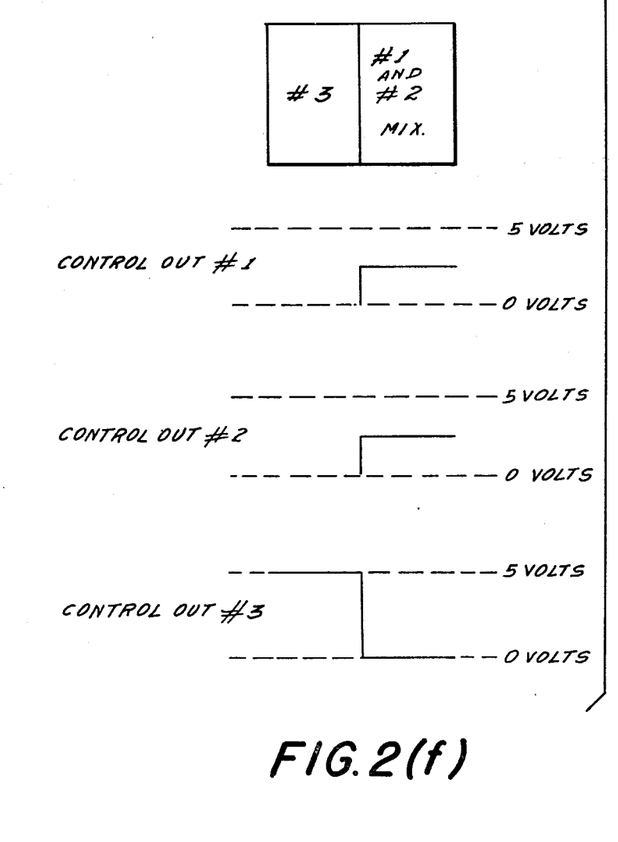

If now the second input signal is set at midpoint (2½ volts), the signal at the first input of unit 32 will be transmitted at half strength to the output. Simultaneously, the second input signal will cause a linear decrease in the output of control module 35 so that this output is reduced to one half the previous value. The first video signal, that is the signal at the first input of unit 31 will thus be attenuated by 50%. The combined output will carry a video output signal which is a 50/50 mixture of the first and second video signal. The display will be that shown in FIG. 2c. If now a third input signal having the shape shown in FIG. 2f, namely a maximum amplitude during each first half line and a minimum amplitude during each second half line, is applied at terminal 36c, the first and second control signals will be overriden during the first half of each horizontal line while the third video signal will be transmitted through unit 33 at full strength. During the second half of each horizontal line the first and second video signals will be transmitted at half strength each through units 31 and 32 respectively, while the third video signal will be suppressed. The resulting display on monitor is shown in FIG. 2f. The left hand side is a function of the third video signal only, while the right hand side corresponds to a mixture of video signals 1 and 2.

Figure 1:
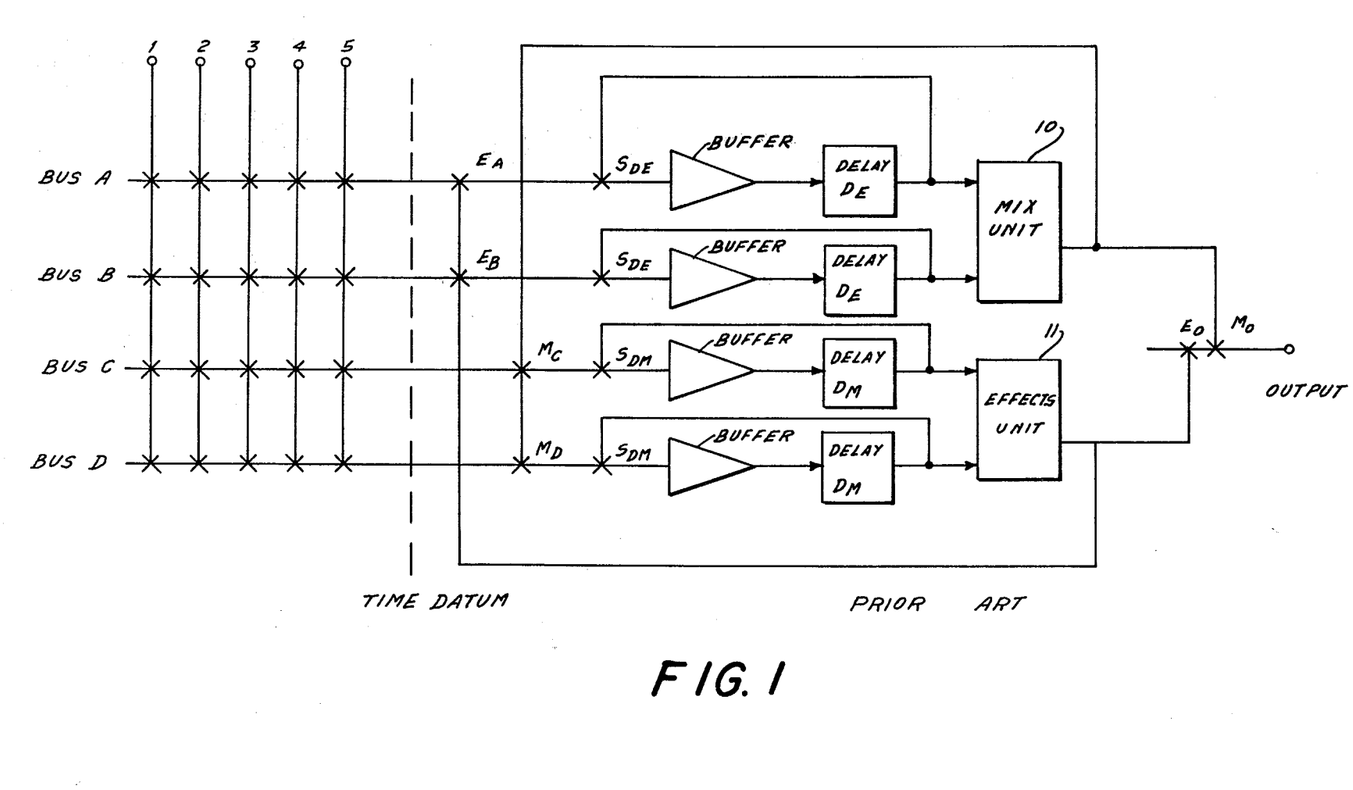
FIG. 1 is a schematic diagram of a prior art special effects generator.

Buses A, B, C of the matrix of FIG. 1 are used to supply the video inputs to units 31, 32 and 33 respectively. Depending upon the effect which is to be achieved, the video input signals can be switched to different buses, that is their position in the predetermined order (A, B, C etc.) can be changed. A signal assigned to bus A is always considered the first in the order, that assigned to bus B the second, etc. The order of the input signals and the order of the associated control signal amplifier means is of course the same. Thus if, for example, the second video input signal is switched to bus A, the first to bus B, and the third to bus C, in order in which the video signals are arranged would be considered the second, first and third in the first, second and third place respectively. The control signal amplifier means are considered similarly arranged, namely those associated with units 31, 32 and 33 are considered first, second and third in the order respectively.

Further it should be noted that synchronization and burst signals are applied to the second video signal input of one of units 31, 32 and 33. Specifically, in FIG. 3 these signals are applied to the second video signal input of unit 33. Simultaneously, blanking signals are applied through diodes 40 and 41 to the main inputs of control modules 35 and 38 and through a diode 42 to the control input of unit 33. The blanking signal is a zero level signal. The control signals applied to units 31, 32 and 33 are thereby signals designed to blank the signal at the first video signal input of each of the units 31-33 and to transfer to the combined output the signal at the second input of each of these units. Since the second video signal inputs to units 31 and 32 are at ground potential, the video output signal will comprise only the synchronization and burst signals applied at the second video signal input of unit 33.

If desired, color background or other signals can be applied to the second inputs of units 31 and/or 32. The signal applied at the second video signal input of any of the units is transferred to the outputs simply by control of the amplitude of the associated control signal. Specifically, if the control signal amplitude is at a maximum, the signal from the first video signal input will be transferred to the output, while for a minimum control signal amplitude the signal from the second video signal input is transferred to the output.

Another feature of the present invention is the ability to fade to black. This is accomplished by a potentiometer 46 whose wiper arm is connected to the main input of units 35 and 38 through diodes 43 and 44 respectively and to the control signal input of unit 33 through a diode 45. All control signal inputs can thus be brought to zero at a controlled rate, merely by controlling the motion of the wiper arm.

Figure 4A:
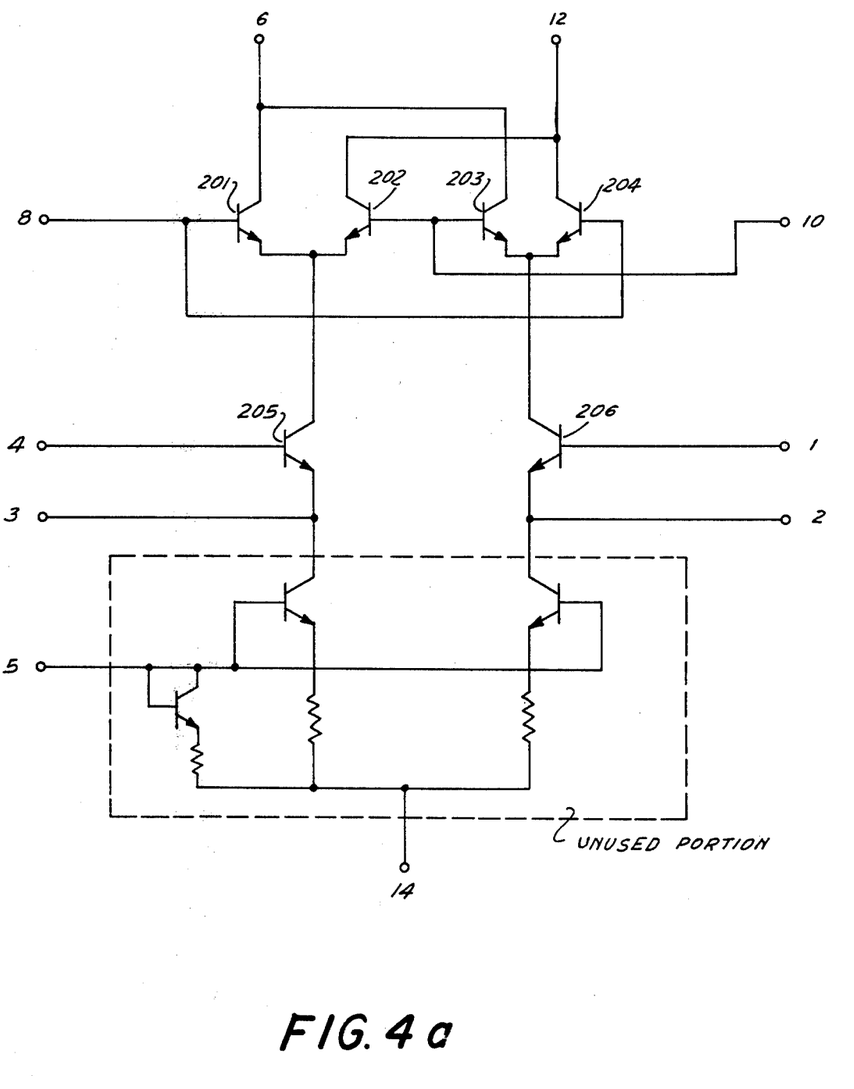
FIG. 4a is a schematic diagram of the current difference amplifier of FIG. 4.

Video amplifier units 31, 32 and 33 are identical to each other. A representative one is shown in greater detail in FIG. 4. The key element in the circuit is an integrated circuit numbered 1596 (shown schematically in FIG. 4a) and manufactured by several large manufacturers. It is essentially a current difference amplifier whose output corresponds to the difference in currents applied at two inputs. The operation of the device is explained in the manufacturer's literature, but as much as is required for present purposes will be explained below.

Referring now to FIG. 4, the first video signal input is denoted by reference numeral 50, while the second video signal input is denoted by reference numeral 51. A variable resistor 52 connected in series with a fixed resistor 53 is connected from terminal 50 to pin 3 and a resistor 54 is connected between an input terminal 51 and pin 2 of the 1596. A source of negative voltage is connected through part of a balancing resistor 57 and a resistor 55 to pin 3 and through the remaining part of resistor 57 and a resistor 56 to pin 2. Pins 1 and 4 are grounded. A control input terminal 58 is connected through a resistor 59 and a voltage divider including resistors 60 and 61 to pin 10. The output of unit 1596 is derived from pin 6 which is connected through a resistor 62 and a resistor 63 to a source of positive potential. Further, the emitter-collector circuit of a transistor 64 is connected from pin 6 to the combined output terminal 65. Terminal 65 is connected through a resistor 66 to a source of negative potential.

The above described arrangement operates as follows: The video input signal applied at terminal 50 and at terminal 51 are variable voltages. Since pins 2 and 3 have low input impedances these must be converted to variable currents. This is accomplished by the use of resistors 52 and 53. The combined value of resistors 52 and 53 in a preferred embodiment is 1,000 ohms, converting a peak-to-peak 1 volt signal to a 1 milliamp peak-to-peak input current. The control input signal is supplied at terminal 58. When pins 8 and 10 are at the same potential, the signal current injected into pin 3 appears attenuated by 50% at output pin 6. If the voltage at pin 10 is approximately 300 millivolts below that at pin 8, then the input signal is attenuated so that no signal appears at pin 6 in response to a signal at pin 3. Conversely, if the voltage at pin 10 is 300 millivolts above that of pin 8, then the full input signal applied at pin 3 appears at pin 6. Pin 8 is biased to 2.5 volts by resistors 62 and 63. Values of resistors 59, 60 and 61 are so chosen that when the control input is at zero volts, the video signal from pin 3 is fully attenuated, while if the control input is taken to plus 5 volts the video signal applied at pin 3 appears at full strength at pin 6.

Transistor 64 and resistors 62, 63 and 66 form a conventional DC level shifter to bring the output signal down to the same DC level as was the input signal. Resistor 62 is a variable resistor allowing the DC level of output to be set accurately.

For proper operation of the circuit, the value of resistance between the negative voltage source and pins 2 and 3 must be exactly equal. Adjustment of resistor 57 accomplishes the level balance.

Figure 5:
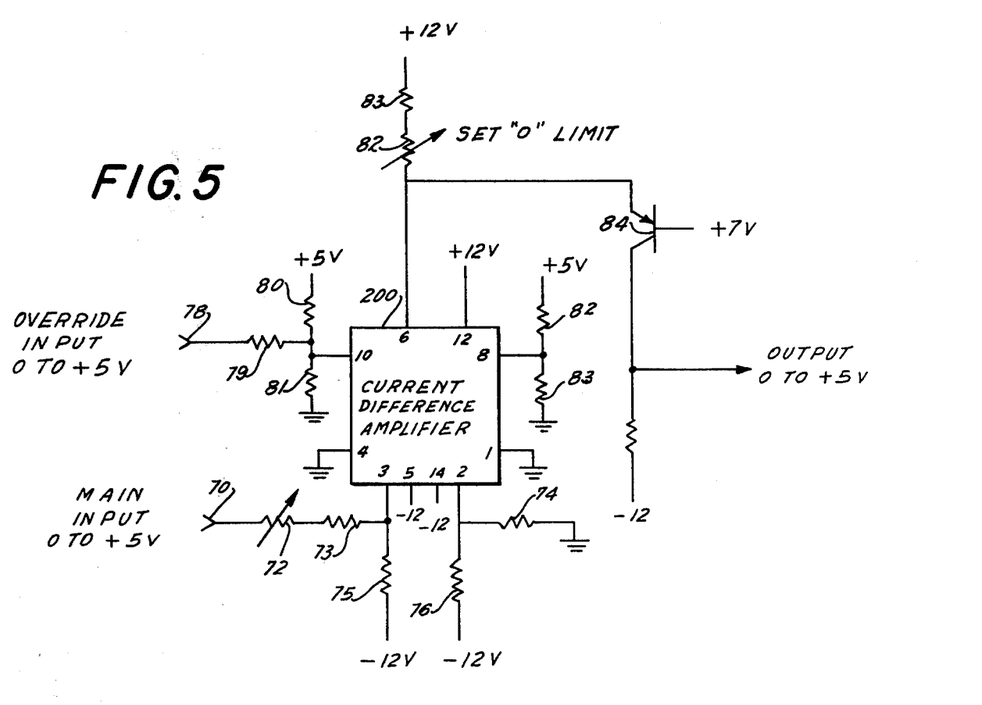
FIG. 5 is a more detailed circuit diagram of the control signal amplifiers of FIG. 3.

Control modules 34, 35 and 38 are also all alike. A representative one is shown in FIG. 5. Corresponding components in FIG. 5 have reference numerals increased by 20 relative to the reference numerals of FIG. 4. In FIG. 5 the main input, 70, is applied to pin 3 through a resistive network including resistors 72, 73 and 75. Pin 2 is connected through a resistor 74 to ground potential. The main input in the preferred embodiment varies between zero and 5 volts. In the absence of an override input, which is applied to a terminal 78 and through a resistive network including resistor 79-81 to pin 10, the voltage at the output varies linearly with that at the main input. If the override voltage is increased to 5 volts, the output is zero volts regardless of the voltage applied to the main input. For intermediate values of the override input, a linear attenuation of the main input voltage takes place, that is the output varies linearly as a function of the difference between the voltages applied at the main and override inputs.

It is seen that the above described system offers a number of advantages relative to the prior art. First, a lesser number of input bus lines is required. Secondly, considerably more flexibility exists. For example, if three effects are desired, two can be made to override the previous ones. For example, a signal applied to bus B can override a signal from bus A wherever it overlaps this signal, while a signal on bus C can be added and, where it overlaps either signals on bus A or on bus B it will override the latter. This can produce an effect over an effect. Thirdly, a mix over a mix over a mix, or an effect over a mix over a mix, or any such combination can be readily obtained. Finally, since the synchronization and burst signals are always derived from the same video signal, possible mismatches between pedestal and synchronization amplitudes of the different video signals can not result in a flash on the screen. The difficulties in the prior art systems have thus been removed without any increase in equipment.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. Combined mixing and effects unit for a first and second video signal comprising
    difference amplifier means having a first and second signal input connected to receive said first and second video signal, respectively, a video output for furnishing an output signal having a first and second component varying as a selectable function of said first and second video signal, respectively, and a control input for receiving a control signal for controlling the gain from said first signal input to said video output and from said second signal input to said video output so that the amplitude of said output signal remains constant and the ratio of said first to said second component varies in correspondence to the amplitude of said control signal:
    means connected to said difference amplifier means for furnishing said control signal to said control input;
    wherein said output signal has only said first and only said second component when the amplitude of said control signal is a first and second predetermined amplitude, respectively;
    wherein said output signal has a predetermined value of said first component and a corresponding predetermined value of said second component when said control signal has a third predetermined amplitude; and
    wherein said control signal has said first amplitude during a predetermined part of a selected one of the line intervals of said first and second video signals and said third amplitude during the remainder of said line interval, whereby mixing and special effects is carried out under control of a single control signal within a single line interval.

2. Apparatus as set forth in claim 1, wherein said difference amplifier means comprises a balanced current amplifier having a first and second control input;
    further comprising means for applying a constant voltage to said second control input so that said gain of said balanced current amplifier from said first input to said video output and from said second input to said video output varies only as a function of a control signal applied to said first control input.

3. Apparatus as set forth in claim 2, wherein said output signal is an output video current; further comprising current-voltage converting means connected to said video output for converting said video output current to a video output voltage.

4. Apparatus for mixing a plurality of video signals, comprising, in combination, a first and second video signal source for furnishing first and second video signals respectively; first and second mixing means each having a signal input, a control input, and a signal output, each for furnishing, at its signal output, a video output signal corresponding to the signal applied at its signal input, the gain of each of said mixing means varying as a function of a predetermined characteristic of a control signal applied at its control input; means for connecting said first and second video signal source to said signal input of said first and second mixing means respectively; means for connecting said signal output of said first mixing means to the signal output of said second mixing means thereby creating a combined output for furnishing a video output signal having a first component corresponding to said first video signal and a second component corresponding to said second video signal; and control signal furnishing means for furnishing a first and second control signal to said control input of said first and second mixing means respectively, the value of said predetermined characteristic of said first and second control signal corresponding to the desired ratio of said first to said second component in said video output signal; and     wherein said control signal furnishing means comprises first control signal furnishing means having a main input, an override input and a first control output, for furnishing a control signal having an amplitude varying as a function of the difference between signals applied at said main and override inputs at said first control output, second control signal furnishing means having a main input and a second control output, for furnishing a control signal having an amplitude corresponding to the amplitude applied at said main input at said second control output, connecting means for connecting said first control output to said control input of said first mixing means and said second control output to said control input of said second mixing means, first input signal furnishing means operable under external control, for furnishing a first input signal to said main input of said first control signal furnishing means; and second input means operable under external control, for furnishing a second input signal to said main input of said second control signal furnishing means and said override input of said first control signal furnishing means, whereby the changes in amplitude of said second input signal adapted to increase said second component of said video output signal cause corresponding decreases in said first component of said video output signal.

5. Apparatus as set forth in claim 4, wherein said apparatus is adapted to mix a first, second and third video signal; further comprising third mixing means having a signal input, a control input, a gain varying as a function of the amplitude of a control signal applied at said control input, and a signal output for furnishing a video output signal at said signal output in response to a video signal applied at said signal input, means for connecting said third video signal source to said signal input of said third mixing means, means for connecting said signal output of said third mixing means to said combined output, means for furnishing a third input signal having an amplitude variable under external control, means for applying said third input signal to said signal input of said third mixing means; wherein said second control signal furnishing means further has an override input; further comprising means for applying said third input signal to said override input of said second control signal furnishing means, additional control signal furnishing means connected between said first control signal furnishing means and said control input of said first mixing means, said additional control signal furnishing means having a main input connected to receive said first control signal, an override input connected to receive said third input signal and a control signal output connected to said control input of said first mixing means, for furnishing said first control signal at said control output, said first control signal having an amplitude varying as a function of the difference in amplitude between a signal applied at said main input and at said override input, whereby changes in said third input signal adapted to create increases in amplitude in said third component of said combined output signal cause corresponding decreases in said first and second components.

6. Apparatus as set forth in claim 4, wherein said second mixing means has a second signal input; further comprising means for applying synchronization and burst signals to said second signal input of said second mixing means, and blanking means for blanking said first and second components of said video output signal during application of said synchronization and burst signals.

7. Apparatus as set forth in claim 6, wherein said means for blanking said first and second components of said video output signal comprises means for shunting said main input of said first and second control signal furnishing means to ground potential during application of said synchronization and burst signals to said second signal input of said second mixing means.

8. Apparatus for combined mixing and special effects for a plurality of video signals, comprising, in combination, a first and second video signal source, for furnishing first and second video signals respectively; and video amplifier means having a first and second signal input connected to said first and second video signal source respectively, a control input, and a video output terminal, for furnishing, at said video output terminal, an output signal having a first and second component varying as a selectable function of said first and second video signal respectively, said video amplifier means including ratio varying means for varying the ratio of said first to said second component in said output video signal under control of a control signal applied to said control input,     means connected to said video amplifier means for furnishing said control signal to said control input;

wherein said output signal has only said first and only said second component when the amplitude of said control signal is a first and second predetermined amplitude, respectively;

wherein said output signal has a predetermined value of said first component and a corresponding predetermined value of said second component when said control signal has a third predetermined amplitude; and     wherein said control signal has said first amplitude during a predetermined part of a selected one of the line intervals of said first and second video signals and said third amplitude during the remainder of said line interval, whereby mixing and special effects is carried out under control of a single control signal within a single line interval.

9. Apparatus for mixing a plurality of video signals to furnish a video output signal having a plurality of components each corresponding to one of said plurality of video signals, comprising, in combination, a plurality of video amplifier means, arranged in a predetermined order, each for amplifying one of said plurality of video signals in accordance with a control signal applied thereto, each of said amplifier means thereby furnishing an amplified video signal, each of said amplified video signals constituting one of said components of said video output signal; means for combining all of said amplified video signals, thereby creating said video output signal; and control signal furnishing means for furnishing said control signals to said amplifiers, said control signal furnishing means comprising externally operable input signal furnishing means, one for each of said components, each for furnishing an input signal indicative of the desired strength of the corresponding component in said video output signal, a plurality of control signal amplifier means, each for furnishing an output signal having a first component controlled by a signal applied at an override input terminal of said control signal amplifier means and a second component controlled by a signal applied at a main input terminal of said control signal amplifier means and decreased in response to increases in said override signal, first means for connecting a selected one of said input signal furnishing means to said main input terminal of one of said control signal amplifier means, second means for connecting a second selected one of said input signal furnishing means to said control input of a selected one of said video amplifier means and to said override inputs of a plurality of said control signal amplifier means, third means for connecting each of the remaining ones of said input signal furnishing means to one main input terminal and at least one override input terminal of said control signal amplifier means, and fourth means for applying said output signals of said control signal amplifier means to said control inputs of said video amplifier means.

10. Apparatus as set forth in claim 9, wherein said decrease of said signal applied at said main input terminal in response to increases of said signal applied at said override terminal is a linear decrease.

11. Apparatus as set forth in claim 9, wherein each of said video amplifier means has a first signal input for receiving one of said plurality of video signals and a second signal input;

wherein the signal applied at said first signal input is amplified to constitute said video output signal when said control signal has a first predetermined amplitude and a signal at said second signal input is amplified to constitute said video output signal when said control signal has a second predetermined amplitude;

wherein all except one of said second signal inputs of said video amplifier means are connected to a reference potential;

further comprising means for applying synchronization signals to said second signal input of said one of said video amplifier means and simultaneously controlling all of said control signals to have said second predetermined amplitude, whereby said synchronization signals applied to said second input of said one of said video signal amplifier means are applied to said video output signal to constitute the synchronization portion thereof.

12. Apparatus as set forth in claim 9, wherein said apparatus is manufactured as an integrated circuit.

13. Apparatus as set forth in claim 9, wherein said control signal amplifier means are arranged in a selected order; and wherein at least a selected one of said control signal amplifier means comprises a plurality of amplifier units connected in cascade, each of said amplifier units having means for decreasing the signal at its output in correspondence with another selected one of said input signals.

14. Apparatus as set forth in claim 13, wherein a selected first of said amplifier means has a plurality of amplifier units corresponding in number to one less than the number of said plurality of control signal amplifier means; and wherein each subsequent one of said amplifier means in said order comprises one amplifier unit less than comprised in the immediately preceding control signal amplifier means in said order.

* * * * *